United States Patent [19]

Keenportz

[11] Patent Number: 5,698,001
[45] Date of Patent: Dec. 16, 1997

[54] SOIL ADDITIVE

[75] Inventor: Lloyd B. Keenportz, Mc Cook, Nebr.

[73] Assignee: RSA Microtech, Incorporated, Seattle, Wash.

[21] Appl. No.: 547,234

[22] Filed: Oct. 24, 1995

[51] Int. Cl.$^6$ .................................................. C05F 11/02
[52] U.S. Cl. ................................. 71/24; 71/903; 71/904; 71/DIG. 2
[58] Field of Search .......................... 71/24, 903, 904, 71/DIG. 2; 106/790

[56] References Cited

U.S. PATENT DOCUMENTS

| | | | |
|---|---|---|---|
| 2,929,700 | 3/1960 | Bennett | 71/1 |
| 3,961,932 | 6/1976 | Miller | 71/1 |
| 3,980,462 | 9/1976 | Corte et al. | 71/1 |
| 4,219,349 | 8/1980 | Bardsley | 71/62 |
| 4,698,090 | 10/1987 | Marihart | 71/24 |
| 4,743,289 | 5/1988 | Mickus et al. | 71/61 |
| 4,786,307 | 11/1988 | Marihart | 71/11 |
| 5,284,513 | 2/1994 | Cowan et al. | 106/790 |

*Primary Examiner*—Ferris Lander
*Attorney, Agent, or Firm*—Hoffman, Wasson & Gitler

[57] ABSTRACT

A soil additive including lignonsulfonate, humic acid, an inert filler, such as bentonite clay, and a metal salt selected from anhydrous borax, magnesium sulfate, copper sulfate, iron sulfate, manganese sulfate, zinc sulfate, ammonium sulfate and gypsum. The composition may also include a predetermined concentration of a surfactant to increase the breakdown of the composition in water.

24 Claims, No Drawings

SOIL ADDITIVE

FIELD OF THE INVENTION

The present invention relates to agriculture. More specifically, the present invention relates to soil additives for nourishing plants.

DESCRIPTION OF THE PRIOR ART

Fruit and vegetable crops require inorganic nutrients to grow healthy and produce large yields. Examples of these nutrients include zinc, boron, manganese, copper, iron and nitrogen, among others. Nutrient deficiencies caused by a lack of one or more of these vital metal elements, causes many serious problems. For example, some plants may experience reduced leaf size or stem growth. Other plants may develop chlorophyll deficiency in the leaves, often resulting in chlorosis. If allowed to progress, chlorosis eventually causes stunted or barren plants.

Each crop planted requires different levels of nutrients. For example, a corn crop with a yield of about 150 bushels per acre generally removes approximately 0.15 pounds of zinc from the soil. Soil containing 1.3 to 1.7 parts per million (ppm) of zinc or more usually is sufficient to provide the corn with the zinc it needs. When the soil contains 0.5 ppm or less, farmers typically will fertilize the soil with a composition that provides for distributing about 10 pounds per acre of elemental zinc. Although introducing such a large amount of zinc when the corn crop requires only 0.15 pounds per acre may seem extreme, the zinc is not readily absorbable by the plant and remains unusable in the soil.

One common soil additive which is spread over plant fields is zinc sulfate. Once in the soil, rain hydrates the granule, loosening the bonds between the sulfate and the zinc, rendering the zinc available for subsequent chemical reactions in the soil. A significant portion of the zinc is converted into zinc carbonate, zinc oxide, zinc ammonium phosphate or zinc phosphate. These newly combined zinc compositions render the zinc unable to be absorbed by the corn plants. Due to these unintended and undesirable reactions between zinc and the soil, farmers must add more zinc per acre than a corn crop ever would require. A significant drawback to excessive addition of inorganic nutrients to the soil is the resultant high concentration of the non-absorbed toxic metal in the soil. In many cases, nutrients such as zinc are combined with a composition including lead. Over time, this concentrated lead washes into the water table, and eventually leaches into the drinking water supply for local residents. Lead is highly poisonous when ingested by humans.

These unintended and undesirable reactions also occur in a similar fashion with the other elements mentioned above. For this reason, it is desirable to develop a soil additive which protects the desired nutrients from unintended and undesirable reactions, while leaving the nutrients available to the crops being fertilized.

One solution to the problem has been to chelate or create a chemical "claw" around the metal. This chemical "claw" not only holds the metal in a structural protective "claw," but chemically neutralizes the positive charge of the metal and imparts a negative charge thereto. Since the reactive soil particles, colloids, also have negative charges, the soil anion will not attach to the metal anion due to the chelation. This permits the soluble metal nutrient to flow through the soil and around the plant roots, thereby rendering the nutrient available to be absorbed by the growing plants.

Chelation is well known in the industry. However, chelates typically contain only one nutrient. Single-nutrient additives are more amenable to reactions with the soil. Known chelates also tend to disintegrate when saturated with water. This collapsing feature operates to concentrate nutrients in a small area, rather than distributing the nutrients for a great number of plants. For example, U.S. Pat. No. 2,929,700, issued Mar. 22, 1960, to James P. Bennett, describes a composition and method of correcting nutrient deficiency in plants. The composition is described as including a powder suspended in a liquid medium, preferably water. The powder is described as being derived from mixing the nutrient desired, for example a metal salt, with lignin sulfonic acid salts in conventional mixing equipment. The composition is applied by spraying on a designated plant. Although Bennett describes use of lignosulfonates and metals, it does not suggest nor teach inclusion of humic acids or clays in combination with the sulphonates and metal salts.

U.S. Pat. No. 3,961,932, issued Jun. 8, 1976, to Ralph Miller, describes a process for coating granular fertilizer with chelated micronutrient. The process includes coating granular fertilizer formulations with one or more chelated metallic micronutrient. Although Miller describes chelation of metal salts with soil additives, it does not suggest nor teach the combination of metal salts with lignonsulphonates, humic acid or clay.

U.S. Pat. No. 3,980,462, issued Sep. 14, 1976, to Herbert Corte et al. describes a fertilizer for long-term supply of plants with chelated micronutrient. The micronutrient are formed by mixing micronutrient ions of elements having atomic numbers between 24 to 30 with charged anion exchangers. Corte et al. describes chelation of metal salts with anionic exchangers, however, does not suggest nor teach combining the metal salts with lignonsulfonates, humic acids or clays.

U.S. Pat. No. 4,219,349, issued Aug. 26, 1980, to Charles E. Bardsley, describes nutrient compositions, methods and processes. The composition includes various nutrients attached to calcinated clay. Bardsley describes attaching nutrients to calcinated clay, however, does not suggest nor teach chelation with non-calcinated clay, nor the combination of clay with lignonsulfonate, humic acid along with clay and metal salts.

U.S. Pat. No. 4,698,090, issued Oct. 6, 1987, to John R. Marihart, describes a process for preparation of compositions for modifying plant growth; compositions for plant growth modification; and method for use thereof. The compositions are composed by reacting organic chelating agents with leonardite ore. Leonardite ore is believed to be an oxidized form of lignite ore. Manihart also discusses chelation of metal salts with organic compounds such as humic acid. However, Manihart does not suggest nor teach the combination or chelation of these metal salts with lignonsulfonate and clay as well.

U.S. Pat. No. 4,743,289, issued May 10, 1988, to J. C. Mickus et al., describes lignosulfonate as granulation aid-particle hardener. Ammonium sulfates are also described as a granulation aid. Mickus et al. describes agglomeration, rather than chelation. Mickus et al. does not teach nor suggest chelation.

U.S. Pat. No. 4,786,307, issued Nov. 22, 1988, to John R. Marihart, describes chelated plant nutrients. The composition includes fulvic acid, extracted from leonardite ore, a metal salt, a hydroxy acid and/or a hydroxyacid salt, and ammonia. Marihart describes chelation of various metal salts with fulvic acid, one of the two main fractions of humic substances dried from soil humus. It does not suggest combining this chelation with lignonsulphate or clay.

Clearly the above demonstrates the need for a chelate of multiple organic and inorganic nutrients that provides for greater dispersement of the nutrients.

None of the above references suggests or teaches the present chelated soil additive.

SUMMARY OF THE INVENTION

The present invention overcomes the limitations of the above inventions by providing a soil additive, including multiple inorganic and organic nutrients, which is capable of delivering the nutrients more efficiently and to a greater number of growing plants.

The present chelated micronutrient compositions are prepared by combining predetermined concentrations of lignosulfonate, humic acid, and an inert compound, such as bentonite clay, and a component selected from the group consisting of anhydrous borax, manganese sulfate, zinc sulfate, magnesium sulfate, copper sulfate, iron sulfate, ammonium sulfate and gypsum. The composition may also include a predetermined concentration of a surfactant to increase the breakdown of the composition in water.

In consideration of the above, an object of the invention is to provide a chelated soil additive including multiple organic and inorganic nutrients for plant growth.

Another object of the invention is to provide a chelated soil additive that provides for defuse dispersal of inorganic and inorganic nutrients.

A further object of the invention is to provide a chelated soil additive composed such that the nutrients are readily absorbable by growing plants and shielded from reacting with and remaining in the soil.

An additional object of the invention is to provide a chelated soil additive that readily dissolves in the soil in the presence of water.

Yet another object of the invention is to provide elements and arrangements thereof in a composition, for the purposes described, which are inexpensive, dependable and fully effective in accomplishing its intended purposes.

These and other objects of the present invention will become readily apparent upon further review of the following specification and drawing.

DETAILED DESCRIPTION OF THE PREFERRED EMBODIMENTS

All the embodiments of the present inventive composition include concentrations of lignonsulfonate, humic acid, bentonite clay and at least one metal salt. Each component provides distinct characteristics to the composition.

Humic acid provides for stable chelation of the element, shielding it from undesired reactions with the soil. Fulvic acid, a related compound, may be used for chelation as well. However, fulvic acid tends to maintain a stronger affinity for the metals than humic acid. The stronger metal affinity restricts ready absorption of the metals by the plants.

The lignonsulfonate is a complexing or chelating agent. The lignonsulfonate also aids in releasing the elements for absorption in the plants.

The bentonite clay aids in distribution of the element. Bentonite clay is preferred over calcinated clay, for example, since the bentonite clay has a greater expansion rate when hydrated. When the clay is hydrated, it swells, distributing nutrients carried over a wide area. The more swelling exhibited by the clay, the more evenly distributed are the nutrients.

The inventive composition also includes a metal salt selected from the group consisting of anhydrous borax, zinc sulfate, magnesium sulfate, copper sulfate, iron sulfate, ammonium sulfate gypsum, manganese sulfate, zinc sulfate and combinations thereof. Selection of one or more of these components depends on the crop and properties of the soil in which the crop is growing.

The examples that follow include differing amounts of selected metal salts. Some crops, such as corn and alfalfa, may require greater amounts of Boron than others, such as wheat. Other factors that influence the type and concentration of one or more metal salts are the soil conditions and adjacent land activities; the target soil may be rich in one nutrient, yet deficient in another.

The preferred ratio of the composition is approximately 3 parts humic acid, 15 parts lignonsulfonate and 5 parts metal salt. This ratio promotes a balance of competing and complementary characteristics of each component. For example, the humic acid encourages stable chelation of the metals, along with lignonsulfonate. Bentonite clay aids in releasing the nutrients into the soil. The 3:15:5 ratio provides sufficient humic acid to maintain the metal in a chelate, yet an adequate amount of lignonsulfonate to permit the metals to be absorbed by the plants treated. The ratio also represents the optimal concentration of metal that may be chelated. Metal concentrations in excess of this ratio are less likely to chelate, therefore will be more likely to react with the soil. Metals that react with the soil, remain in the soil, eventually building into poisonous levels.

The inventive composition also may include a non-ionic surfactant. The basic ingredient of the surfactant is a block polymer of carbonyldiamide polyoxyalkzlated glycol complex with approximately 6% adjutant aids. The surfacant concentration may range from 1.25% to 2.5%.

The chelates described below, without a surfactant, break down in water after approximately 11 minutes. By comparison, Sulphur- and oxi-sulphonated products may take from 24 to 60 hours to break down. The added surfactant reduces the breakdown time of the present composition to approximately 1.5 minutes. Reduced breakdown time allows farmers to more instantaneously counteract malnourishment of their crops, likely averting long-term effects.

The inventive compositions, for the most part, also include a concentration of inert filler. This filler may be composte material or clay. The filler is purposed at balancing the mixture during its combination. The filler material assures that the desired ratios of components are combined.

In order that those skilled in the art may better understand how the present invention is practiced, the following examples are given byway of illustration and not necessarily by way of limitation.

EXAMPLE 1

RUFFIN TUFF SUPERBORAN

TABLE 1

| (10% B, 5% Zn, 5% Mn, ¾% Cu) | | |
|---|---|---|
| COMPONENT | WEIGHT | RANGE |
| 21.5% Anhydrous Borax | 48% | 2.5–15% |
| 35.5% Zinc Sulphate ZnSO$_4$ | 14.6% | 10–20% |
| 32% MnSO$_4$ | 16% | 10–15% |
| 25.5% CuSO$_4$ | 3.65% | 0.75–15% |
| Lignonsulfonate | 10% | 2–20% |
| Humic Acid | 5% | 2–20% |
| Inert | 3.40% | Filler |

Referring to Table 1, above, the first embodiment of the present invention compositions includes a substantial amount of Borax. Borax does not chelate. The borax is trapped in a pseudo-chelate, among the chelated metal salts. When the salts are hydrated and liberated from the bonds fostered by the lignonsulfonate and humic acid, the borax freely passes into the moist ground.

By way of explanation, the range represents the range of total percentage weight of the metal indicated. For example, the weight of the anhydrous borax component constitutes 48%. However, the composition contains only 21.5% borax. The product from multiplying the strength of the composition by the weight yields the total percentage weight of the metal itself. In this case, 21.5%, 48% yields 10.32%, which falls within the 2.5–15% range listed adjucently.

Referring to Table 2, below, this embodiment of the inventive composition has proven to be more effective in enhancing the nutritional value of crops than conventional metal sulfates commonly used. The results shown in Table 2 demonstrate that the instant composition improved the nutritional content of the crop samples tested. In order to fully appreciate the results presented, a brief discussion of the components measured is presented below.

All plant materials are made up of cells. Cell walls primarily are made up of cellulose, hemicellulose, and lignin. Cell walls provide structural support for the plants and enclose the cell contents. The cells contain mainly sugars, starches, proteins, and minerals. Animals can digest these contents provided the cell walls may be broken down, rendering them available to their digestive systems. The cell walls may be digested partially only by ruminant animals.

The nutritional value may be shown through fiber analysis of the plant cells. Most laboratories identify the ruminant digestible fractions of the feed stuff broken down into: crude protein, acid detergent fiber, total digested nutrients, relative feed value, and minerals, such as calcium, and phosphorus. Crude fiber is measured by boiling sample in sulfuric acid, then in sodium hydroxide. The undissolved residue is rinsed with dilute sulfuric acid, deionized water, and ethanol, then reduced to ash. The residue less the ash yields crude fiber. The crude fiber value includes the amount of cellulose and some indigestible lignins. Unfortunately, the crude fiber value does not distinguish digestible from indigestible fiber. The crude fiber measure generally overestimates the digestibility of high fiber ruffages and underestimates the digestibility of low fiber ruffages.

Crude protein is measured by chemically separating the fiber, then drying the components. The protein component may be weighed and compared to the weights of other plant proteins.

Acid detergent fiber is measured by boiling the sample in an acid detergent solution. The mash is filtered. The residue contains wall fiber, primarily cellulose, lignin and silica. The acid detergent fiber content is higher than the crude fiber content because it includes more of the cell wall contents. The acid detergent fiber value is regarded as the best way of predicting the usefulness of ruffages.

Neutral detergent fiber is measured by boiling the sample in a neutral detergent solution. The wash is filtered. The residue contains all of the structural plant parts, including cellulose, hemicellulose, and lignin. Neutral detergent fiber value quantifies the amount of space the feed intake occupies in the rumen. Feed intake is an important part of total feed value, but has not been correlated as well to animal performance as acid detergent fiber.

Relative feed value is the ratio of the acid detergent fiber value divided by the neutral detergent fiber value. The relative feed value provides an objective ranking of forages based on their nutritional value and quality.

Total digestible nutrients measures feed stuff energy content. The total digestible nutrients value sums the carbohydrates, digestible protein, and fats in a feed stuff. In the industry, the total digestible nutrient content is regarded as providing an objective value for feed stuffs that may be used as a comparison against other feeds. However, it is considered less accurate at estimating animal performance than net energy values.

TABLE 2

| Date | Crude Protein | | Acid Detergent Fiber | | Total Digest Nutrients | | Relative Feed Value | | Calcium | | Phosphorus | |
|---|---|---|---|---|---|---|---|---|---|---|---|---|
| | R | S | R | S | R | S | R | S | R | S | R | S |
| 5/11/94 | 5.6 | 4.9 | 5.0 | 4.5 | 15.4 | 13.0 | N/A | N/A | .31 | .25 | .09 | .08 |
| 6/1/94 | 4.9 | 4.8 | 6.1 | 4.9 | 13.9 | 12.2 | 174 | 194 | .30 | .22 | .07 | .07 |
| 7/6/94 | 15.0 | 13.2 | 25.2 | 22.9 | 48.0 | 40.2 | N/A | N/A | 1.04 | .80 | .19 | .17 |
| 8/4/94 | 5.1 | 5.2 | 5.3 | 6.3 | 13.7 | 14.4 | 197 | 176 | .25 | .31 | .07 | .06 |
| 9/9/94 | 6.2 | 6.1 | 5.9 | 5.7 | 18.4 | 17.3 | 232 | 216 | .32 | .30 | .08 | .07 |
| Mean | 7.36 | 6.84 | 9.5 | 8.86 | 21.88 | 19.42 | 201 | 195 | .444 | .376 | .10 | .09 |

Feed stuff also includes many minerals such as calcium and phosphorus. Calcium and phosphorus are used in skeletal development and milk production. The level of minerals in a feed may be adjusted to suite the particular needs of the herd for which the feed is targeted.

On Table 2, a comparison is made between the present composition, as designated by an "R," and conventional sulfates, as designated by an "S." Traditionally, sulfates have been used as soil additives for many crops. For the test, the metal sulfates were applied to samples similar to those to which the present composition were applied. However, the sulfates and the composition were applied in the ratio of 10 to 1 to their respective sample plots: Ten pounds of metal sulfate were applied to a comparable plot of ground to which one pound of the instant composition was applied. Owing to the effective chelation of humic acid, lignonsulfonate and metal salt, described supra, less of the present soil additive is required, as compared to conventional sulfates.

The results shown indicate that the instant composition performed as well on the first three cuttings and out performed the sulfates on the last two cuttings. On average, the instant composition resulted in approximately 7.60% more crude protein than the conventional sulfate. The tested corp also exhibited 7.22% more acid detergent fiber than the crops treated with conventional sulfate. Over all, the crops treated with the instant composition presented 12.66% more total digestive nutrients than similar crops treated with sulfites. The crops treated with the present composition also boasted 20.00% more calcium and 11.11% more phosphorus.

The present composition was approximately 5% less expensive as the conventional sulfates used for the test. In short as much of the present composition performed better than compositions know and used at less cost.

EXAMPLE 2

RUFFIN TUFF LAWN IRON

TABLE 3

| COMPONENT | WEIGHT | RANGE |
|---|---|---|
| 30% FeSO$_4$ | 24% | 1–15 |
| 32% MnSO$_4$ | 9.5% | 1–15 |
| NH$_4$(2)SO$_4$ | 20% | — |
| Lignin Sulfonate | 15% | 2–20% |
| Humic Acid | 6.25% | 2–20% |
| Clay | 15% | 5–20% |
| Inert Filler | 9.25% | Filler |

Referring to table 3, above, the second embodiment of the present inventive composition includes a substantial amount of iron sulfate, manganese sulfate and ammonium sulfate. These three metal salts chelate with humic acid and lignonsulfonate. This particular combination of metals satisfies the nutritional demands of conventional grasses found in many lawns.

This soil additive, when tested against a known iron sulfate additive product, demonstrated superior performance. The study was conducted on a commercial grass farm on Frio silty clay soil with a pH of 8.0. The test was conducted on St. Augustinegrass showing severe symptoms of iron chlorosis.

Referring to table 4, below, each product was applied at the lowest recommended rate, as indicated by "1X," and at 2, 3, 4, and 5 times that rate. Three plots, indicated by S$_1$–S$_3$, were reserved and monitored for each soil additive tested, at each application level: three plots were treated with the recommended amount of FeSO$_4$, three plots were treated with twice the recommended amount and so forth.

Color ratings of treated plots were made weekly for 5 weeks and then at weeks 7 and 11. Ratings ranged on a scale of 1 to 9 with 1 being the most chlorotic and 9 being the darkest green. A rating of 3 or less generally would be considered unacceptable to the average homeowner.

TABLE 4

| | COLOR RATINGS | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| Appl. | Week 1 | | | | Week 2 | | | | Week 3 | | | | Week 4 | | | | Week 5 | | | | Week 7 | | | | Week 11 | | | |
| Rate | S$_1$ | S$_2$ | S$_3$ | Av | S$_1$ | S$_2$ | S$_3$ | Av | S$_1$ | S$_2$ | S$_3$ | Av | S$_1$ | S$_2$ | S$_3$ | Av | S$_1$ | S$_2$ | S$_3$ | Av | S$_1$ | S$_2$ | S$_3$ | Av | S$_1$ | S$_2$ | S$_3$ | Av |
| | | | | | | | | | | | Ruffin | | | | | | | | | | | | | | | | | |
| 1X | 1 | 5 | 3 | 3 | 1 | 7 | 5 | 4 | 1 | 7 | 5 | 4 | 3 | 7 | 7 | 6 | 7 | 7 | 7 | 7 | 3 | 3 | 5 | 4 | 1 | 5 | 1 | 2 |
| 2X | 3 | 5 | 3 | 4 | 3 | 7 | 5 | 5 | 3 | 7 | 7 | 6 | 7 | 7 | 7 | 7 | 7 | 7 | 7 | 7 | 3 | 3 | 5 | 4 | 3 | 5 | 3 | 4 |
| 3X | 5 | 7 | 5 | 6 | 7 | 9 | 7 | 8 | 5 | 9 | 7 | 7 | 7 | 9 | 9 | 8 | 7 | 7 | 7 | 7 | 5 | 5 | 5 | 5 | 5 | 5 | 5 | 5 |
| 4X | 8 | 7 | 5 | 7 | 8 | 9 | 7 | 8 | 7 | 9 | 7 | 8 | 9 | 9 | 9 | 9 | 7 | 9 | 9 | 8 | 7 | 5 | 6 | 6 | 5 | 5 | 5 | 5 |
| 5X | 8 | 7 | 7 | 7 | 9 | 9 | 9 | 9 | 7 | 9 | 9 | 8 | 9 | 9 | 9 | 9 | 9 | 9 | 9 | 9 | 7 | 5 | 7 | 6 | 7 | 5 | 5 | 6 |
| | | | | | | | | | | | FeSO$_4$ | | | | | | | | | | | | | | | | | |
| 1x | 2 | 5 | 3 | 3 | 2 | 5 | 5 | 4 | 3 | 5 | 5 | 4 | 3 | 5 | 5 | 4 | 5 | 5 | 7 | 6 | 3 | 3 | 3 | 3 | 3 | 3 | 1 | 2 |
| 2X | 5 | 7 | 5 | 6 | 3 | 7 | 7 | 6 | 5 | 7 | 7 | 6 | 5 | 7 | 7 | 6 | 7 | 7 | 7 | 7 | 3 | 3 | 3 | 3 | 3 | 3 | 2 | 3 |
| 3X | 7 | 9 | 7 | 8 | 5 | 9 | 7 | 7 | 7 | 9 | 7 | 8 | 7 | 7 | 7 | 7 | 7 | 7 | 9 | 8 | 3 | 3 | 5 | 4 | 3 | 3 | 3 | 3 |
| 4X | 8 | 9 | 7 | 8 | 5 | 9 | 7 | 7 | 7 | 9 | 7 | 8 | 7 | 7 | 7 | 7 | 7 | 9 | 9 | 8 | 3 | 3 | 5 | 4 | 3 | 4 | 5 | 4 |
| 5X | 8 | 9 | 8 | 8 | 5 | 9 | 7 | 7 | 7 | 9 | 7 | 8 | 7 | 9 | 7 | 8 | 7 | 9 | 9 | 8 | 3 | 5 | 5 | 4 | 5 | 4 | 5 | 5 |
| | | | | | | | | | | | Ironite | | | | | | | | | | | | | | | | | |
| 1X | 1 | 3 | 1 | 2 | 1 | 3 | 1 | 2 | 1 | 5 | 3 | 3 | 2 | 5 | 5 | 4 | 3 | 5 | 5 | 4 | 3 | 3 | 3 | 3 | 1 | 3 | 1 | 2 |
| 2X | 1 | 3 | 5 | 3 | 1 | 5 | 5 | 3 | 1 | 7 | 7 | 5 | 3 | 7 | 7 | 6 | 5 | 7 | 7 | 6 | 3 | 3 | 3 | 3 | 1 | 5 | 3 | 3 |
| 3X | 1 | 5 | 5 | 4 | 3 | 7 | 7 | 6 | 5 | 7 | 7 | 6 | 5 | 7 | 9 | 7 | 7 | 7 | 7 | 7 | 3 | 5 | 5 | 4 | 1 | 5 | 5 | 4 |
| 4X | 1 | 5 | 5 | 4 | 1 | 7 | 7 | 5 | 3 | 7 | 7 | 6 | 7 | 7 | 7 | 7 | 7 | 7 | 7 | 7 | 3 | 5 | 5 | 4 | 1 | 5 | 5 | 4 |
| 5X | 1 | 5 | 5 | 4 | 1 | 7 | 7 | 5 | 3 | 7 | 7 | 6 | 5 | 7 | 9 | 7 | 7 | 7 | 7 | 7 | 3 | 5 | 5 | 4 | 1 | 7 | 5 | 4 |
| | | | | | | | | | | | Fe-Chelate Sequestrene 138 | | | | | | | | | | | | | | | | | |
| 1X | 3 | 7 | 5 | 5 | 5 | 7 | 5 | 6 | 5 | 7 | 7 | 6 | 5 | 7 | 7 | 6 | 7 | 7 | 5 | 6 | 3 | 3 | 5 | 4 | 3 | 3 | 4 | 3 |
| 2X | 3 | 7 | 5 | 5 | 5 | 7 | 5 | 6 | 3 | 7 | 7 | 5 | 5 | 7 | 7 | 6 | 7 | 7 | 7 | 7 | 5 | 5 | 5 | 5 | 5 | 5 | 4 | 5 |
| 3X | 5 | 7 | 5 | 6 | 5 | 7 | 5 | 6 | 5 | 7 | 7 | 6 | 5 | 7 | 7 | 6 | 7 | 7 | 7 | 7 | 5 | 5 | 5 | 5 | 5 | 5 | 4 | 5 |
| 4X | 5 | 7 | 5 | 6 | 7 | 7 | 7 | 7 | 7 | 7 | 7 | 7 | 7 | 7 | 7 | 7 | 9 | 9 | 7 | 8 | 7 | 5 | 5 | 6 | 5 | 5 | 4 | 5 |
| 5X | 5 | 8 | 7 | 7 | 7 | 7 | 7 | 7 | 7 | 7 | 7 | 7 | 7 | 7 | 7 | 7 | 9 | 9 | 7 | 8 | 7 | 5 | 5 | 6 | 5 | 6 | 4 | 5 |

Generally, application rates of 3 and 4 times the lowest recommended rate of application were required to produce ratings of 7 or higher. High alkalinity of the soil conditions may explain the high demand for nutrients. However, these conditions are common to sites requiring iron supplementation.

When the present invention was applied at 3 times the recommended rate, the grass assumed a highly desirable color response through week 5.

Only one other available product produced a similar response. Referring to table 5, below, the preferred combination of nutrients does not appreciably increase the yield of the grasses treated. The table shows the number of ounces of fresh grass clippings harvested per sample 20"×6' plot. This sample was taken after the third week of application.

Consistent yield is especially important to homeowners who, although desirous of a deep green lawn, would rather not have to mow more often as a consequence. Although more green, a shaggy lawn may present an unkempt appearance.

In sum, the second embodiment of the present composition provides for healthier-looking grass without an increased yield.

TABLE 5

| Application Rate | YIELD | | |
|---|---|---|---|
| | $S_1$ | $S_2$ | Av |
| Ruffin Dry | | | |
| 1× | 3.5 | 2.5 | 3.0 |
| 2× | 3.5 | 4.5 | 4 |
| 3× | 4 | 3 | 3.5 |
| 4× | 4 | 4 | 4 |
| 5× | 4 | 4 | 4 |

Following are other embodiments of the present invention compositions. Each emphasizes a different element that may be better suited to a particular crop. For example, corn, planted in soil having a high pH, may respond better to the Magnesium granular, as represented on table 6. Wheat, planted in low-pH soil, on the other hand, may thrive better having been treated with Manganese granular, as represented on table 10.

EXAMPLE 3

RUFFIN TUFF 4% MAGNESIUM GRANULAR

TABLE 6

| COMPONENTS | WEIGHT | RANGE |
|---|---|---|
| 16% $MgSO_4$ | 24.5% | 1–15% |
| $NH_4(2)SO_4$ | 19% | — |
| Clay | 15% | 5–20% |
| Humic Acid | 3.75% | 5–20% |
| Lignonsulfonate | 15% | 2–20% |
| Inert Filler | 22.75% | Filler |

EXAMPLE 4

RUFFIN TUFF 5% CALCIUM GRANULAR

TABLE 7

| COMPONENT | WEIGHT | RANGE |
|---|---|---|
| Gypsum (20% Calcium) | 25% | 1–15% |
| $NH_4(2)SO_4$ | 17% | — |
| Humic Acid | 3.75% | 2–20% |
| Lignonsulfonate | 15% | 2–20% |
| Clay | 15% | 5–20% |
| Inert Filler | 24.25% | Filler |

EXAMPLE 5

RUFFIN TUFF 5% COPPER GRANULAR

TABLE 8

| COMPONENT | WEIGHT | RANGE |
|---|---|---|
| 25.5% $CuSO_4$ | 20% | 0.75–15% |
| $NH_4(2)SO_4$ | 22% | — |
| Clay | 15% | 5–20% |
| Humic Acid | 3.75% | 2–20% |
| Lignonsulfonate | 15% | 2–20% |
| Inert Filler | 24.25% | Filler |

EXAMPLE 6

RUFFIN TUFF 5% IRON GRANULAR

TABLE 9

| COMPONENT | WEIGHT | RANGE |
|---|---|---|
| 30% $FeSO_4$ | 17% | 1–15% |
| $NH_4(2)SO_4$ | 20% | — |
| Lignonsulfonate | 15% | 2–20% |
| Humic Acid | 6.25% | 2–20% |
| Clay | 15% | 5–20% |
| Inert Filler | 26.75% | Filler |

EXAMPLE 7

RUFFIN TUFF 5% MANGANESE GRANULAR

TABLE 10

| COMPONENT | WEIGHT | RANGE |
|---|---|---|
| 32% $MnSO_4$ | 16% | 1–15% |
| $NH_4(2)SO_4$ | 22% | — |
| Lignonsulfonate | 15% | 2–20% |
| Humic Acid | 6.25% | 2–20% |
| Clay | 15% | 5–20% |
| Inert Filler | 26% | Filler |

EXAMPLE 8

RUFFIN TUFF 10% ZINC GRANULAR

TABLE 11

| COMPONENT | WEIGHT | RANGE |
|---|---|---|
| 35.5% $ZnSO_4$ | 29.0% | 1–20% |
| $NH_4(2)SO_4$ | 18% | — |
| Lignonsulfonate | 15% | 2–20% |
| Humic Acid | 6.25% | 2–20% |
| Clay | 15% | 5–20% |
| Inert Filler | 16.75% | Filler |

EXAMPLE 9

RUFFIN TUFF CROP MIX (5:3:1 Zn, Mn, Cu)

TABLE 12

| COMPONENT | WEIGHT | RANGE |
|---|---|---|
| 35.5% $ZnSO_4$ | 15% | 1–20% |
| 32% $MnSO_4$ | 10% | 1–15% |
| 25.5% $CuSO_4$ | 4% | 0.75–15% |
| Lignonsulfonate | 20% | 2–20% |
| Humic Acid | 4.25% | 2–20% |
| Clay | 15% | 5–20% |
| Inert Filler | 26.75% | Filler |

The present inventions is not intended to be limited to the embodiments described above, but to encompass any embodiment within the scope of the claims following.

I claim:

1. A chelated plant micronutrient soil additive composition comprising:
   a) at least one metal salt selected from the group consisting of anhydrous borax, zinc sulfate, magnesium sulfate, manganese sulfate, copper sulfate, iron sulfate, ammonium sulfate, calcium sulfate and combinations thereof;
   b) lignosulfonate;
   c) humic acid;
   d) clay; and
   e) an inert filler.

2. A chelated plant micronutrient soil additive composition as claimed in claim 1 further comprising:
   f) a surfactant.

3. A chelated plant micronutrient soil additive composition as claimed in claim 2, wherein said lignosulfonate is substantially 10% of said composition; said humic acid is substantially 5% of said composition; and said clay is substantially 15% of said composition.

4. A chelated plant micronutrient soil additive composition as claimed in claim 2, wherein said lignosulfonate is substantially 15% of said composition; said humic acid is substantially 6.25% of said composition; and said clay is substantially 15% of said composition.

5. A chelated plant micronutrient soil additive composition as claimed in claim 2, wherein said lignosulfonate is substantially 15% of said composition; said humic acid is substantially 3.75% of said composition; and said clay is substantially 15% of said composition.

6. A chelated plant micronutrient soil additive composition as claimed in claim 2, wherein said lignosulfonate is substantially 20% of said composition; said humic acid is substantially 9.25% of said composition; and said clay is substantially 15% of said composition.

7. A chelated plant micronutrient soil additive composition as claimed in claim 1, wherein:
   said lignosulfonate is present in a range of from 2 to 20% of said composition;
   said humic acid is present in a range of from 2 to 20% of said composition; and
   said clay is present in a concentration greater than 0 and less than 20% of said composition.

8. A chelated plant micronutrient soil additive composition as claimed in claim 1, wherein said a ratio of said at least one metal salt: said lignosulfonate: said humic acid is substantially 5:13:3.

9. A chelated plant micronutrient soil additive composition as claimed in claim 1, wherein said at least one metal salt is a combination of anhydrous borax, zinc sulfate, manganese sulfate and copper sulfate.

10. A chelated plant micronutrient soil additive composition as claimed in claim 9, wherein said composition comprises:
    from 2.5 to 10% anhydrous borax;
    from 10 to 20% zinc sulfate;
    from 10 to 15% manganese sulfate; and
    from 0.75 to 15% copper sulfate.

11. A chelated plant micronutrient soil additive composition as claimed in claim 1, wherein said at least one metal salt is a combination of manganese sulfate and iron sulfate.

12. A chelated plant micronutrient soil additive composition as claimed in claim 11; wherein said composition comprises:
    from 1 to 15% manganese sulfate; and
    from 1 to 15% iron sulfate.

13. A chelated plant micronutrient soil additive composition as claimed in claim 1; wherein said at least one metal salt is magnesium sulfate.

14. A chelated plant micronutrient soil additive composition as claimed in claim 13; wherein said composition comprises from 1 to 15% magnesium sulfate.

15. A chelated plant micronutrient soil additive composition as claimed in claim 1; wherein said at least one metal salt is calcium sulfate.

16. A chelated plant micronutrient soil additive composition as claimed in claim 15; wherein said composition comprises from 1 to 15% calcium sulfate.

17. A chelated plant micronutrient soil additive composition as claimed in claim 1; wherein said at least one metal salt is copper sulfate.

18. A chelated plant micronutrient soil additive composition as claimed in claim 17; wherein said composition comprises from 0.75% to 15% copper sulfate.

19. A chelated plant micronutrient soil additive composition as claimed in claim 1; wherein said at least one metal salt is iron sulfate.

20. A chelated plant micronutrient soil additive composition as claimed in claim 19; wherein said composition comprises from 1 to 15% iron sulfate.

21. A chelated plant micronutrient soil additive composition as claimed in claim 1; wherein said at least one metal salt is manganese sulfate.

22. A chelated plant micronutrient soil additive composition as claimed in claim 21; wherein said composition comprises from 1 to 15% manganese sulfate.

23. A chelated plant micronutrient soil additive composition as claimed in claim 1; wherein said at least one metal salt is zinc sulfate.

24. A chelated plant micronutrient soil additive composition as claimed in claim 23; wherein said composition comprises from 1 to 15% zinc sulfate.

* * * * *